(12) United States Patent
Steiner

(10) Patent No.: US 11,492,056 B2
(45) Date of Patent: Nov. 8, 2022

(54) TRACK LINK HAVING CANTED RAIL SURFACE EDGES AND MACHINE TRACK WITH SAME

(71) Applicant: Caterpillar Inc., Deerfield, IL (US)

(72) Inventor: Kevin Steiner, Tremont, IL (US)

(73) Assignee: Caterpillar Inc., Peoria, IL (US)

(*) Notice: Subject to any disclaimer, the term of this patent is extended or adjusted under 35 U.S.C. 154(b) by 748 days.

(21) Appl. No.: 16/244,864

(22) Filed: Jan. 10, 2019

(65) Prior Publication Data
US 2020/0223500 A1  Jul. 16, 2020

(51) Int. Cl.
*B62D 55/21* (2006.01)
*B62D 55/32* (2006.01)
*B62D 55/20* (2006.01)

(52) U.S. Cl.
CPC ............. *B62D 55/21* (2013.01); *B62D 55/32* (2013.01); *B62D 55/20* (2013.01)

(58) Field of Classification Search
CPC ......... B62D 55/20; B62D 55/21; B62D 55/32
USPC ........................................................ D15/28
See application file for complete search history.

(56) References Cited

U.S. PATENT DOCUMENTS

| 3,955,855 A | 5/1976 | Massieon et al. |
| 5,887,958 A | 3/1999 | Bissi et al. |
| 7,798,579 B2 | 9/2010 | Mulligan |
| 9,290,217 B2 | 3/2016 | Steiner |
| D804,538 S * | 12/2017 | Brooks ........................ D15/28 |
| D832,308 S | 10/2018 | Demski |
| 2018/0029653 A1* | 2/2018 | Johannsen ........... B62D 55/213 |

FOREIGN PATENT DOCUMENTS

| DE | 112012004527 | | 8/2014 | |
| JP | 58067572 A | * | 4/1983 | ............. B62D 55/32 |
| JP | 09249162 A | * | 9/1997 | |
| JP | 2007290568 A | * | 11/2007 | ............. B62D 55/20 |
| WO | 2010109277 | | 9/2010 | |

* cited by examiner

*Primary Examiner* — Kip T Kotter
(74) *Attorney, Agent, or Firm* — Brannon Sowers & Cracraft

(57) ABSTRACT

A track link for a machine track includes an elongate link body having an upper rail surface with an inboard peripheral edge and an outboard peripheral edge each formed upon a first link strap, a second link strap, and a middle section. The upper rail surface defines a longitudinal midline and at least one of the inboard peripheral edge or the outboard peripheral edge upon the first link strap and the second link strap is canted, in an inboard-outboard direction, to a longitudinal midline of the upper rail surface.

19 Claims, 4 Drawing Sheets

US 11,492,056 B2

TRACK LINK HAVING CANTED RAIL SURFACE EDGES AND MACHINE TRACK WITH SAME

TECHNICAL FIELD

The present disclosure relates generally to machine track, and more particularly to a track link having canted upper rail surface peripheral edges.

BACKGROUND

A great many different machines utilize tracks as ground-engaging propulsion elements, notably track-type tractors, excavators, and certain mining machines. Such tracks typically include a plurality of rotatable track-engaging elements, with each of two tracks at opposite sides of the machine to form endless loops of links moved about the rotatable track-engaging elements. Two chains of track links with bolted-on, or integral, track shoes are held together by way of track pins in a typical configuration. The demands placed upon such machinery can be quite substantial with high torsional loads, shearing loads, impacts, corrosive environments, and still others. Machine tracks are typically built robust to provide an operating life of thousands of hours. Developing a root-cause understanding of, and on that basis addressing, wear phenomena in machine tracks has been the subject of significant engineering attention over the years.

The different wear phenomena and wear rates experienced by track components result from how the machine is used, the skill and/or experience of the operator, and also the specific underfoot conditions and substrate materials at worksite environments. Machines operated in sandy materials tend to wear certain components relatively more rapidly than machines used in less sandy and more earthen environments, for instance. In hard rock environments, while the substrate materials can be quite abrasive the tendency for particulates to be generated and find their way between and among components is relatively low, hence wear rates may be lower. Service intervals for machine track can vary based upon these and other factors. Since such components can be relatively expensive to service and/or swap out for new components, as well as the obligate machine down time, engineering in this field has often focused on reducing or modulating wear rates amongst the various components. U.S. Pat. No. 3,955,855 to Massicon et al. is directed to a track-type machine with track links having contact surfaces formed of material relatively more wear-resistant than a base material of the track links. Other, more recent efforts have proposed variable hardening depths of track links, specialized link shapes and/or proportions, and still other structural or material composition, and manufacturing strategies.

SUMMARY OF THE INVENTION

In one aspect, a track link includes a elongate link body having a first link strap, a second link strap, and a middle section. The elongate link body further includes a first track pin bore and a second track pin bore formed, respectively, in the first link strap and the second link strap and each extending between an inboard side and an outboard side of the elongate link body. The elongate link body further includes a lower shoe-mounting surface, and an upper rail surface having an inboard peripheral edge and an outboard peripheral edge each formed upon the first link strap, the second link strap, and the middle section. The upper rail surface defines a longitudinal midline, and at least one of the inboard peripheral edge or the outboard peripheral edge upon each of the first link strap and the second link strap is canted, in an inboard-outboard direction, to the longitudinal midline.

In another aspect, a track link includes an elongate link body having a first link strap, a second link strap, and a middle section, and having a first track pin bore and a second track pin bore formed, respectively, in the first link strap and the second link strap and each extending between an inboard side and an outboard side of the elongate link body. The elongate link body further includes a lower shoe-mounting surface, and an upper rail surface structured for contacting rotating elements in a machine track and defining a longitudinal midline. The upper rail surface is formed upon the first link strap, the second link strap, and the middle section, and is canted, in an inboard-outboard direction, to the longitudinal midline in each of the first link strap and the second link strap.

In still another aspect, a machine track includes a first track chain, a second track chain, and a track pin coupling together the first track chain and the second track chain. Each of the first track chain and the second track chain includes a plurality of track links each having an upper rail surface formed in part upon a first link strap, a second link strap, and a middle section. The upper rail surface in each of the plurality of track links includes an inboard peripheral edge and an outboard peripheral edge, and at least one of the inboard peripheral edge and the outboard peripheral edge is canted, in the corresponding first link strap and second link strap, in an inboard-outboard direction.

DETAILED DESCRIPTION

Figure 1:
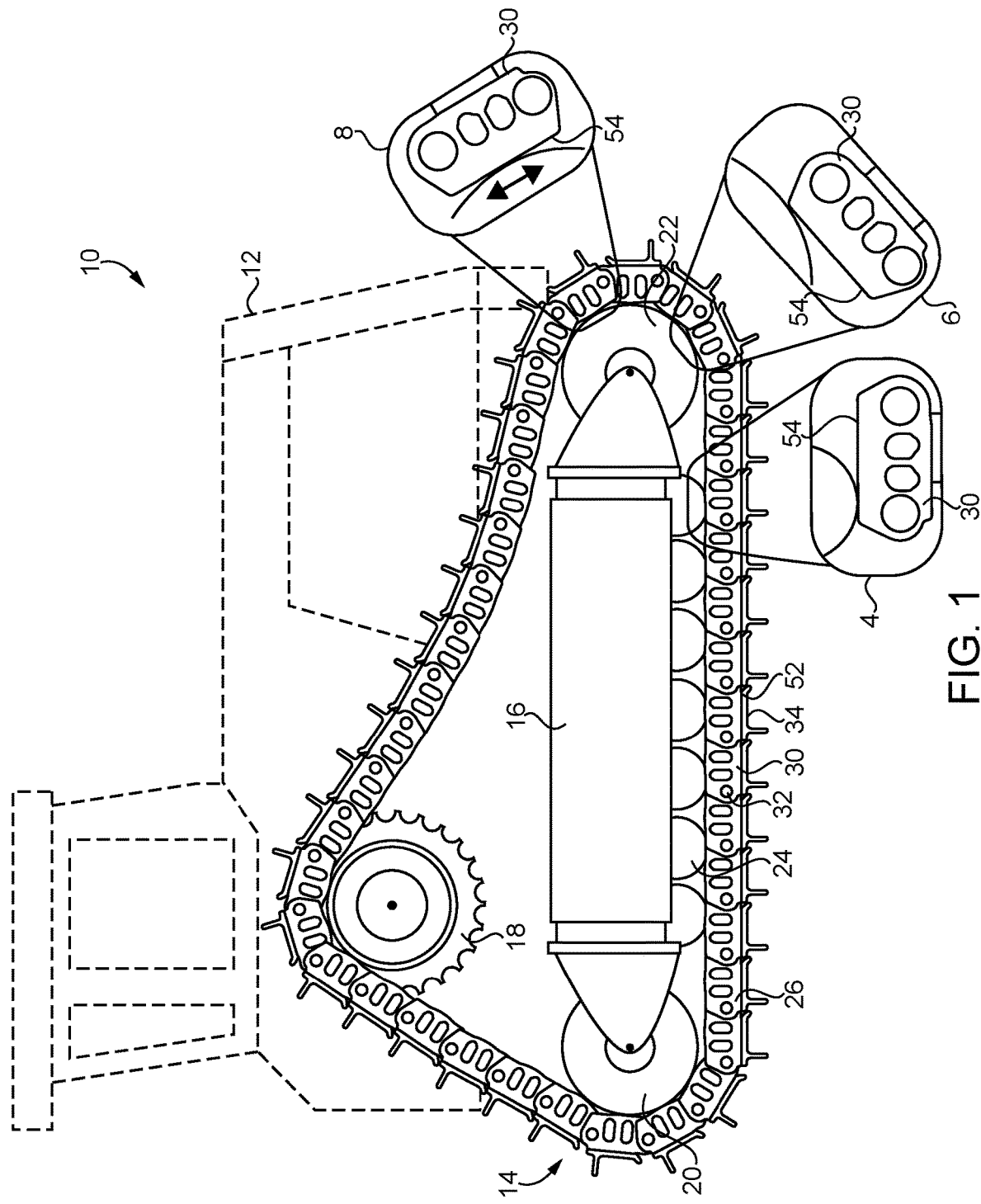
FIG. 1 is a side diagrammatic view, including detailed enlargements, of a track-type machine, according to one embodiment.

Referring to FIG. 1, there is shown a ground-engaging machine 10 (hereinafter "machine 10") including a frame or body 12, according to one embodiment. Machine 10 includes a ground-engaging track system 14 (hereinafter "track system 14"), having a track roller frame 16 and a plurality of rotatable track-engaging elements including a drive sprocket 18, a back idler 20, a front idler 22, and a plurality of track rollers 24. A machine track 26 extends about the plurality of rotatable track-engaging elements in a generally conventional manner. Machine 10 is shown with track system 14 in a so-called "high drive" configuration, however, it should be appreciated that an oval track configuration or still another configuration might be employed in other embodiments. In still other instances, track system 14 might be used in a different machinery implementation altogether, such as a conveyor. As will be further apparent from the following description, track 26 is uniquely configured to address certain wear phenomena experienced during service.

Figure 2:
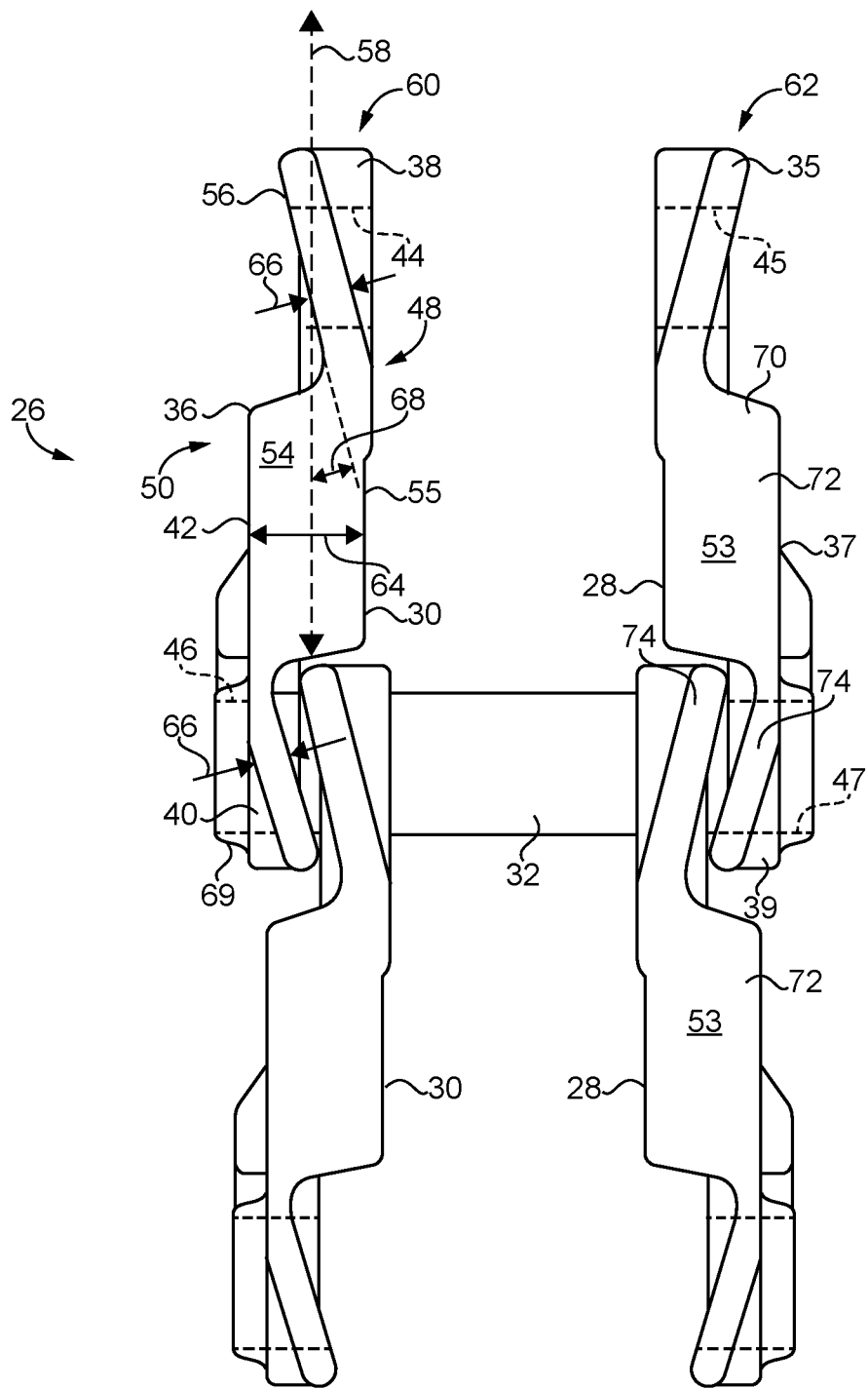
FIG. 2 is an elevational view of a portion of a machine track, according to one embodiment.

Referring also to FIG. 2, there is shown a portion of track including a first track chain 60 and a second track chain 62 arranged in parallel. Each of first track chain 60 and second track chain 62 may be formed by a plurality of coupled-together track links, and in the FIG. 2 illustration a track pin 32 couples together first track chain 60 and second track chain 62. In the illustrated embodiment as in FIG. 1, a plurality of track shoes 34 are coupled to a plurality of track links 30. It will be appreciated that track 26 is one track positioned at a first side of machine 10, and machine 10 will include another track positioned at an opposite side that is not visible in FIG. 1. Track links in first track chain 60 are identified with reference numeral 30 in FIG. 2, whereas track links in second track chain 62 are identified with reference numeral 28. It should also be appreciated that track links 30 and track links 28 may be mirror images of one another, and thus description herein of any one of track links 30 within first track chain 60 should be understood by way of analogy to refer to track links 28 in second track chain 62. Similarly, discussion herein of a track link in the singular should be understood to refer to any of the plurality of track links used in track 26 except where otherwise indicated or apparent from the context.

Track link 30 includes an elongate link body 36 having a first link strap 38, a second link strap 40, and a middle section 42. Elongate link body 36 may be a one-piece casting or forging, and further has a first track pin bore 44 and a second track pin bore 46 formed, respectively, in first link strap 38 and second link strap 40. Each of first track pin bore 44 and second track pin bore 46 extends between an inboard side 48 and an outboard side 50 of elongate link body 36. A first track pin bore 45 and a second track pin bore 47 are formed in an elongate link body 37 of track link 28. In an implementation, track pin 32 can be interference fitted within second track pin bore 46 in second link strap 40, and would be slip fitted through a counterpart track pin bore in a first link strap of an adjacent track link. In other instances, rather than interference fitting, positive pin retention or some other strategy might be employed.

Elongate link body 36 further includes a lower shoe-mounting surface 52, as shown in FIG. 1, and an upper rail surface 54 having an inboard peripheral edge 55 and an outboard peripheral edge 56 each formed upon first link strap 38, second link strap 40, and middle section 42. Also in the illustrated embodiment first link strap 38 and second link strap 40 are offset from one another in an inboard-outboard direction. The inboard-outboard direction can be understood as a direction extending (left-right in FIG. 2) between and beyond inboard side 48 and outboard side 50, in other words directions generally normal to a longitudinal running direction of elongate link body 36. Rather than having link straps offset in the inboard-outboard direction, embodiments are contemplated where elongate link body 36 is straight. An outboard pin boss 69 is formed on or by second link strap 40. Embodiments are contemplated where each of first link strap 38 and second link strap 40 includes an outboard or an inboard pin boss. Track pin 32 could support a rotatable bushing structured to engage with pockets between teeth of drive sprocket 18, although the present disclosure is also not limited in this regard and a bare pin or a fixed bushing could be used.

Upper rail surface 54 further defines a longitudinal midline 58, and at least one of inboard peripheral edge 55 or outboard peripheral edge 56 upon each of first link strap 38 and second link strap 48 is canted, in the inboard-outboard direction, to longitudinal midline 58. It has been discovered that canting of upper rail surface edges, and as depicted canting of portions of upper rail surface 54 itself, can impart various advantages relating to the manner and extent to which upper rail surface 54 wears or causes wear of other components, as further discussed below. In the illustrated embodiment of FIG. 2 each of inboard peripheral edge 55 and outboard peripheral edge 56 in first link strap 38 and second link strap 40 is canted, in the inboard-outboard direction, to longitudinal midline 58. Inboard peripheral edge 55 and outboard peripheral edge 56 may be parallel to one another in each of first link strap 38 and second link strap 40, although again as will be apparent in connection with discussion of other embodiments, the present disclosure is not thereby limited.

Upper rail surface 54 may further have a first width 64 within middle section 42, and a second width 66 within each of first link strap 38 and second link strap 40. Second width 66 may be about 45% or less of first width 64. As can also be seen from the FIG. 2 illustration, inboard peripheral edge 55 and outboard peripheral edge 56 in first link strap 38 are canted toward outboard side 50 of elongate link body 36, and inboard peripheral edge 55 and outboard peripheral edge 56 in second link strap 40 are canted toward inboard side 48 of elongate link body 36. In other embodiments, the direction of canting could be different. It can be noted that upper rail surface 54 (and its inboard peripheral edge 55 and outboard peripheral edge 56) within first link strap 38 extends generally from a right forward corner of middle section 42, forwardly and in an outboard direction, toward and across longitudinal midline 58. Alternatives where the subject portion of upper rail surface 54 extends from an upper left corner of middle section 42, forwardly and in an inboard direction, will be readily conceived and understood to be within the scope of the present disclosure. In still other arrangements, upper rail surfaces could be canted in the same direction within each of a first link strap and a second link strap in a plurality of track links, and placed in an alternating arrangement in a track chain with track links having upper rail surfaces canted in opposite directions.

Figure 3:
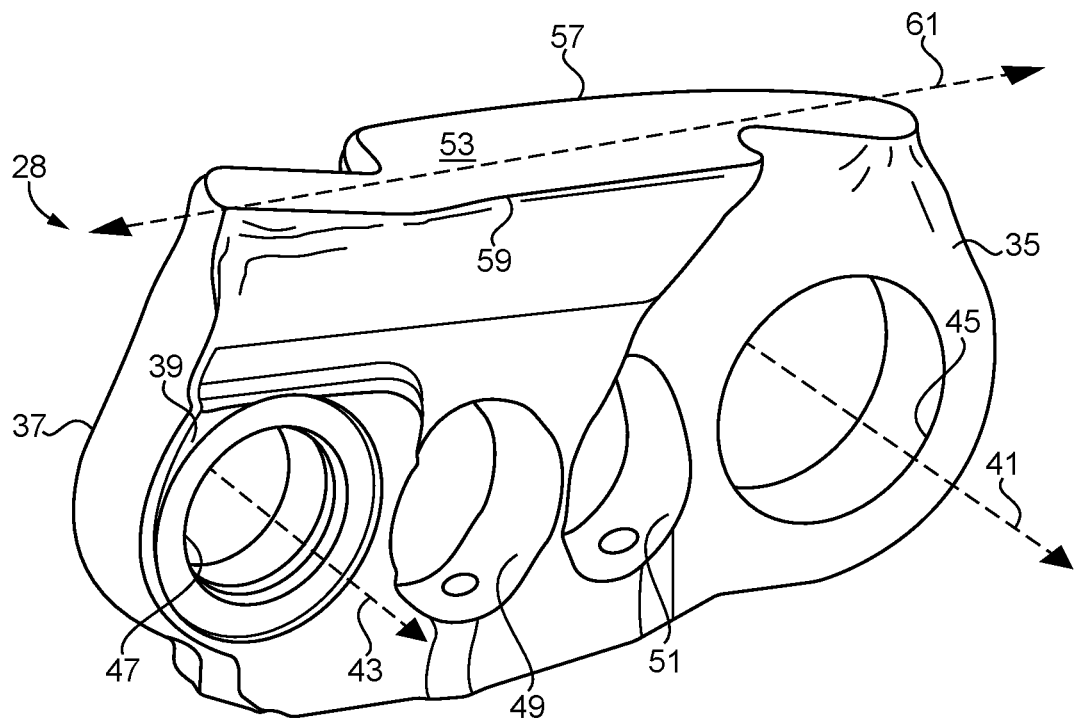
FIG. 3 is a perspective view of a track link, according to one embodiment.

In an implementation, upper rail surface 54 in each of first link strap 38 and second link strap 40 is canted toward longitudinal midline 58 at an inside angle 68 that is less than 45%. Referring also to FIG. 3, there is shown track link 28 including an elongate link body 37 and illustrating additional features not visible in FIG. 2. Elongate link body 37 includes an upper rail surface 53 canted generally opposite to the canting of upper rail surface 54 in track link 30. FIG. 3 also illustrates a first track pin bore 45 and a second track pin bore 47, a first nut seat window 51 and a second nut seat window 49 each extending through elongate link body 37, in a generally conventional manner. Upper rail surface 53 includes an inboard peripheral edge 57 and an outboard peripheral edge 59. It should be noted that first track pin bore 45 and second track pin bore 37 define center axes 41 and 43, respectively, oriented perpendicular to a longitudinal midline 61 and extending in the inboard-outboard direction between the inboard side (not visible) and outboard side (shown) of elongate link body 37. Upper rail surface 53, and inboard and outboard peripheral edges 57 and 59 within first and second link straps 35 and 39, can be understood to be canted relative to longitudinal midline 61 and also canted, in a projection plane parallel to upper rail surface 53, relative to the corresponding one of center axes 41 and 43.

Figure 4:
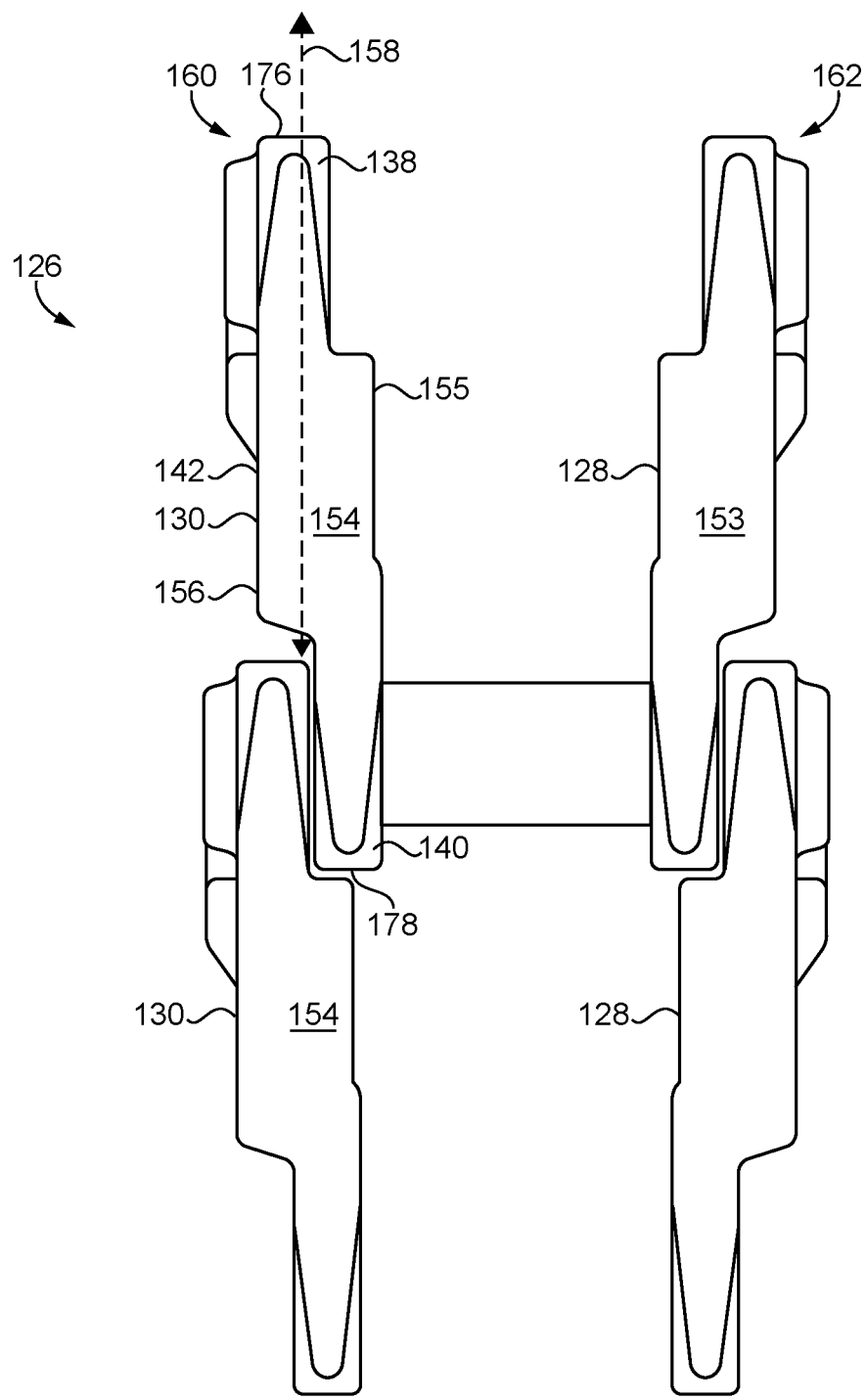
FIG. 4 is an elevational view of a portion of a machine track, according to one embodiment.

Turning now to FIG. 4, there is shown a portion of a track 126 according to another embodiment and including a first track chain 160 and a second track chain 162. First track chain 160 is formed by a plurality of track links 130, and second track chain 162 is formed by a plurality of track links 128. Track link 130 includes an upper rail surface 154 formed in part upon each of a first link strap 138, a second link strap 140, and a middle section 142. Upper rail surface 154 includes an inboard peripheral edge 155 and an outboard peripheral edge 156. First link strap 138 includes a first link body end 176, and second link strap 140 includes a second link body end 178. Inboard peripheral edge 155 and outboard peripheral edge 156 in first link strap 138 are canted, in an inboard-outboard direction, to a longitudinal midline 158 defined by upper rail surface 154, and are convergent in a direction of first link body end 176. Inboard peripheral edge 155 and outboard peripheral edge 156 in second link strap 140 are analogously canted and convergent in a direction of second link body end 178. Inboard peripheral edge 155 and outboard peripheral edge 156 in each of first link strap 138 and second link strap 140 define a generally isosceles triangular shape. Rather than an isosceles triangular shape, in other instances inboard peripheral edge 155 and outboard peripheral edge 156 in each of first link strap 138 and second link strap 140 might define a right triangular shape, a scalene triangular shape, for example, or a non-triangular shape. A surface area of upper rail surface 154 in first link strap 138 and in second link strap 140 might together form a surface area that is about 90% or less of a surface area formed by upper rail surface 154 within middle section 142. As used herein, the term "about" can be understood in the context of conventional rounding to a consistent number of significant digits. Accordingly, "about 45" means from 44.5 to 45.4, and so on.

INDUSTRIAL APPLICABILITY

Referring to the drawings generally, but in particular now back to FIG. 1, there are shown several detailed enlargements at 4, 6, and 8, illustrating different patterns of contact between track 26 and rotatable track-engaging elements in track system 14. At detailed enlargement 4, a track roller 24 is shown as it might appear rolling along in contact with upper rail surface 54. It will be appreciated that an available surface area of contact between track roller 24 and upper rail surface 54 can vary as track roller 24 rolls along first track rail 60 and second track rail 62. It will also be recalled that a width of upper rail surface 54 in each one of first link strap 38 and second link strap 30 may be about 45% or less of the width within middle section 42. Depicted in FIG. 2 is a compound track rail 70 formed by second track chain 62. Track rail 70 has a plurality of unitary segments 72 formed by upper rail surface 53 in middle sections (not numbered) of the corresponding plurality of track links 28. Track rail 70 also has a plurality of compound segments 74 alternating with the plurality of unitary segments 72 and formed by adjacent upper rail surfaces 53 in first link strap 35 and second link strap 39 in adjacent ones of track links 28. This means, generally, that track roller 24 has less available surface area to contact in compound segments 74 than in unitary segments 72. The lesser surface area can enable an increased wear rate in compound segments 74 over what might be observed otherwise that compensates for wear associated with upper rail surface 53 within the middle sections as further discussed herein. Relatively narrow contact width within link straps could be expected under certain circumstances to induce a phenomenon known as "roller trenching" absent a mitigating design strategy. By canting upper rail surface 53 within link straps as discussed herein, and the upper rail surfaces (or edges thereof) in other embodiments, more distributed wear due to the progressively inboard or outboard pattern of contact as track roller 24 rolls along track rail 70 can be expected to reduce or eliminate roller trenching.

Shown in detailed enlargement 6 is front idler 22 as it might appear in contact with track link 30, when track link 30 is coming into or out of contact with front idler 22, respectively, when machine 10 is operated to advance track 26 in a forward direction or a reverse direction. As track link 30 rotates relative to other track links during engaging and disengaging about front idler 22 a degree of sliding contact can be expected to occur between front idler 22, and analogously back idler 20, and upper rail surface 54. Sliding contact is relatively minor in link straps 38 and 40 as depicted in detailed enlargement 6, and generally more severe upon upper rail surface 54 within middle section 42 of track link 30. Detailed enlargement 8 generally depicts sliding contact that might occur in middle section 42. Accordingly, in earlier designs a wear phenomenon known as "scalloping" could be expected to occur as a result of the sliding contact. The relatively lesser surface area of upper rail surface 54 in link straps 38 and 40 causes wear to hasten in those areas over what might otherwise occur with a relatively wider or otherwise greater surface area. Canted upper rail surfaces according to the present disclosure can thus be both oriented to distribute contact and avoid roller trenching, while also being reduced in area to drive wear rates to be more or less consistent regardless of particular longitudinal location along upper rail surface 54. This capability is expected to be associated with both improved service life of the track, as the rough ride or other problems that can result from scalloping are mitigated, as well as any need for premature replacement of track rollers 24 or other problems that can result from roller trenching.

With regard to the embodiment of FIG. 4, as an idler rolls along track rail 160 and track rail 162 a relatively greater slip within middle section 142 as track 126 comes into and out of engagement with the cylindrical track roller surface can be expected, however, the relatively reduced surface area for contact with the idler within link strap 138 and link strap 140 versus middle section 142 can result in a more even rate of wear and mitigated or eliminated scalloping. Track links 28 and 30 may also distribute wear to limit roller trenching, in a manner generally analogous to that described above in connection with the embodiments of FIGS. 2 and 3.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:
1. A track link comprising:
  an elongate link body including a first link strap, a second link strap, and a middle section, and having a first track pin bore and a second track pin bore formed, respectively, in the first link strap and the second link strap and each extending between an inboard side and an outboard side of the elongate link body;
  the elongate link body further including a lower shoe-mounting surface, and an upper rail surface having an inboard peripheral edge and an outboard peripheral edge each formed upon the first link strap, the second link strap, and the middle section;

the upper rail surface defining a longitudinal midline, and at least one of the inboard peripheral edge or the outboard peripheral edge upon each of the first link strap and the second link strap being canted, in an inboard-outboard direction, to the longitudinal midline; and each of the inboard peripheral edge and the outboard peripheral edge in the first link strap and the second link strap is canted, in the inboard-outboard direction, to the longitudinal midline.

2. The track link of claim 1 wherein the first track pin bore and the second track pin bore define center axes, and the at least one of the inboard peripheral edge or the outboard peripheral edge upon each of the first link strap and the second link strap is canted, in a projection plane, to the corresponding one of the center axes.

3. The track link of claim 1 wherein the upper rail surface has a first width within the middle section, and a second width within each of the first link strap and the second link strap, and the second width is about 45% or less of the first width.

4. The track link of claim 1 wherein:
the first link strap includes a first link body end and the second link strap includes a second link body end;
the inboard peripheral edge and the outboard peripheral edge in the first link strap are convergent in a direction of the first link body end; and
the inboard peripheral edge and the outboard peripheral edge in the second link strap are convergent in a direction of the second link body end.

5. The track link of claim 4 wherein the inboard peripheral edge and the outboard peripheral edge in each of the first link strap and the second link strap define an isosceles triangular shape.

6. The track link of claim 1 wherein:
the first link strap and the second link strap are offset from one another in the inboard-outboard direction; and
the inboard peripheral edge and the outboard peripheral edge are parallel to one another in each of the first link strap and the second link strap.

7. The track link of claim 6 wherein the inboard peripheral edge and the outboard peripheral edge in the first link strap are canted toward the outboard side of the elongate link body, and the inboard peripheral edge and the outboard peripheral edge in the second link strap are canted toward the inboard side of the elongate link body.

8. A track link comprising:
an elongate link body including a first link body end, a first link strap, a second link body end, a second link strap, and a middle section, and having a first track pin bore and a second track pin bore formed, respectively, in the first link strap and the second link strap and each extending between an inboard side and an outboard side of the elongate link body;
the elongate link body further including a lower shoe-mounting surface, and an upper rail surface structured for contacting rotating elements in a machine track and defining a longitudinal midline;
the upper rail surface being formed upon the first link strap, the second link strap, and the middle section;
the upper rail surface is canted, in an inboard-outboard direction, to the longitudinal midline in the first link strap longitudinally between the middle section and the first track pin bore and longitudinally between the first track pin bore and the first link body end;
the upper rail surface is canted, in the inboard-outboard direction, to the longitudinal midline in the second link strap longitudinally between the middle section and the second track pin bore and longitudinally between the second track pin bore and the second link body end; and
the canting of the upper rail surface in each of the first link strap and the second link strap is continuous from the middle section to the respective first link body end and second link body end.

9. The track link of claim 8 wherein the upper rail surface is canted toward the longitudinal midline in directions of the first link body end and the second link body end in the first link strap and the second link strap, respectively.

10. The track link of claim 9 wherein the upper rail surface includes an inboard peripheral edge and an outboard peripheral edge, and the inboard peripheral edge and the outboard peripheral edge are parallel to one another in each of the first link strap and the second link strap.

11. The track link of claim 10 wherein the upper rail surface in each of the first link strap and the second link strap is canted toward the longitudinal midline at an inside angle that is less than 45 degrees.

12. The track link of claim 10 wherein the upper rail surface has a first width within the middle section, and a second width within each of the first link strap and the second link strap, and the second width is about 45% or less of the first width.

13. A machine track comprising:
a first track chain;
a second track chain;
a track pin coupling together the first track chain and the second track chain;
each of the first track chain and the second track chain including a plurality of track links each having an upper rail surface formed in part upon a first link strap, a second link strap, and a middle section; and
the upper rail surface in each of the plurality of track links having an inboard peripheral edge and an outboard peripheral edge, and each of the inboard peripheral edge and the outboard peripheral edge being canted, in the corresponding first link strap and second link strap, in an inboard-outboard direction.

14. The machine track of claim 13 wherein the inboard peripheral edge and the outboard peripheral edge are parallel to one another in the corresponding first link strap and second link strap.

15. The machine track of claim 14 wherein the inboard peripheral edge and the outboard peripheral edge, in the corresponding first link strap, are canted toward one of an inboard side or an outboard side of the corresponding track link, and the inboard peripheral edge and the outboard peripheral edge, in the corresponding second link strap, are canted toward the other of an inboard side or an outboard side of the corresponding track link.

16. The machine track of claim 15 wherein the first link strap and the second link strap in each of the plurality of track links are offset from one another.

17. The machine track of claim 16 wherein the upper rail surface in the first link strap and the second link strap of each of the plurality of track links is canted toward the longitudinal midline at an inside angle that is less than 45 degrees.

18. The machine track of claim 16 wherein each of the first track chain and the second track chain includes a track rail having a plurality of unitary segments formed by the upper rail surfaces within middle sections of the corresponding plurality of track links, and a plurality of compound segments alternating with the plurality of unitary segments and formed by adjacent upper rail surfaces of the first link strap and the second link strap in adjacent ones of the corresponding plurality of track links.

19. The machine track of claim 18 wherein a roller contact width of the track rail within each of the plurality of compound segments is less than 90% of a roller contact width of the track rail within each of the plurality of unitary segments.

* * * * *